(12) United States Patent
Okui et al.

(10) Patent No.: US 7,372,258 B2
(45) Date of Patent: May 13, 2008

(54) ROTATION DETECTION DEVICE

(75) Inventors: Yoichi Okui, Kariya (JP); Norihiro Kurumado, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/711,151

(22) Filed: Feb. 27, 2007

(65) Prior Publication Data

US 2007/0290679 A1     Dec. 20, 2007

(30) Foreign Application Priority Data

Feb. 27, 2006   (JP) .............................. 2006-050525

(51) Int. Cl.
*G01B 7/30* (2006.01)
(52) U.S. Cl. ................................. 324/207.25
(58) Field of Classification Search ........... 324/207.25, 324/173–174; 73/514.31, 514.39
See application file for complete search history.

(56) References Cited

U.S. PATENT DOCUMENTS 5,637,995 A    6/1997 Izawa et al.
6,064,200 A    5/2000 Saito et al.
7,141,966 B2 * 11/2006 Sumiya et al. ......... 324/207.25
2005/0015968 A1 * 1/2005 Shinjo et al. .................. 29/593

FOREIGN PATENT DOCUMENTS

| JP | U2-48882 | 4/1990 |
| JP | A7-113811 | 5/1995 |
| JP | A-2006-275639 | 10/2006 |

\* cited by examiner

*Primary Examiner*—Bot LeDynh
(74) *Attorney, Agent, or Firm*—Posz Law Group, PLC

(57) ABSTRACT

A rotation detection device includes a cover member having an opening end, and a sensor body member which has a mounting portion protruding from a mounting-portion protrusion surface and a joint portion positioned around the mounting-portion protrusion surface. The opening end of the cover member is joined to the joint portion of the sensor body member in such a manner that a magnet is housed in the cover member and the mounting-portion protrusion surface is covered by the cover member. A magnetism detection unit is fixedly mounted to the mounting portion and arranged in the magnet. One of the joining surface of the opening end of the cover member and the joining surface of the sensor body member has at least one of a flange-shaped portion and a bent portion. The other of the joining surfaces has a shape corresponding to that of the one thereof.

12 Claims, 7 Drawing Sheets

ROTATION DETECTION DEVICE

CROSS REFERENCE TO RELATED APPLICATION

This application is based on a Japanese Patent Application No. 2006-050525 filed on Feb. 27, 2006, the disclosure of which is incorporated herein by reference.

FIELD OF THE INVENTION

The present invention relates to a rotation detection device for detecting a rotation.

BACKGROUND OF THE INVENTION

Generally, with reference to FIG. 11, a rotation detection device is used to detect a rotation of an object such as a vehicle-mounted engine and a vehicle wheel (for wheel velocity detection) and the like, for example, as disclosed in JP-7-260813A (U.S. Pat. No. 5,637,995).

As shown in FIG. 11, the rotation detection device has a sensor chip 101 (magnetism detection unit) which is arranged to face a rotor RT as the detection object. The sensor chip 101 has a magnetic resistance element pair 1 including a magnetic resistance element MRE1 and a magnetic resistance element MRE2, and a magnetic resistance element pair 2 including a magnetic resistance element MRE3 and a magnetic resistance element MRE4. The sensor chip 101 and a processing circuit thereof are arranged in an integrated circuit, and integrally molded in a mold resin 102.

Specifically, the sensor chip 101 is mounted to one end of a lead frame (not shown) in the mold resin 102. A feeding terminal T1, an output terminal T2, and a GND (grounding) terminal T3 are arranged at other end of the lead frame to be respectively connected to the exterior.

Moreover, a magnet 30 (bias magnet) is arranged in the vicinity of the sensor chip 101 to surround the mold resin 102. The magnet 30 applies a bias magnetic field to the magnetic resistance element pairs 1 and 2. The magnet 30 which has a hollow cylinder shape is provided with a hollow portion 31 extending in the longitudinal direction of the magnet 30. The mold resin 102 in which the sensor chip 101 is embraced is inserted in the hollow portion 31.

In the practical use of the rotation detection device, the mold resin 102 in which the sensor chip 101 is molded, and the magnet 30, and the like are accommodated in a suitable case member. The whole of the rotation detection device which has been cased is mounted to an engine or the like, with reference to FIG. 12. The component shown FIG. 12 and that shown in FIG. 11 which have the same function are same numbered.

As shown in FIG. 12, the mold resin 102 and the magnet 30 are integrated with a housing resin 120 (sensor body member), in such a manner that the mold resin 102 and the magnet 30 are accommodated in a cap member 40 (cover member) which is bottomed. The housing resin 120 has a flange 123 used for a connection with an engine body or the like, and a connector portion 124 which extends from the flange 123 and functions as a connector for a connection with an electronic control device or the like of the exterior through wirings. The terminals T1-T3 are respectively electrically connected with metal terminals 100a-100c which are integrally arranged in the housing resin 120 and also used as terminals of the connector portion 124.

The rotor RT which faces the sensor chip 101 can be constructed of a magnetic member having a gear shape, for example. With a rotation of the rotor RT, there is a variation in a magnetic vector which is resultant due to the magnetic field generated by the rotator RT and that generated by the magnet 30. The sensor chip 101 detects the vibration in the magnetic vector as a variation in a resistance value of the magnetic resistance element. Thus, a rotation detection signal can be obtained.

Then, the rotation information of the rotator RT is transferred to the exterior electronic control device (not shown) or the like through the output terminal T2, after passing various process circuits such as a differential amplifier, and a comparator and the like.

However, in this case, the mold resin 102 where the sensor chip 101 is embraced, the magnet 30 and the cap member 40 are respectively constructed of primary-molding members by injection molding. These primary-molding members are sequentially assembled in the order of the mold resin 102, the magnet 30 and the cap member 40, and then set in a suitable mold. Thereafter, the housing resin 120 is constructed by injection molding to be arranged around the mold resin 102, the magnet 30 and the cap member 40. That is, the housing resin 120 is formed as a secondary-molding member, so that the sensor body member is integrated.

Therefore, the sensor chip 101 (of rotation detection device) where the magnetic resistance element pairs are arranged is isolated from ambient air of the exterior and protected from pollution and the like, by the mold resin 102.

However, when the sensor chip 101 is molded in the mold resin 102, the interior stress is directly applied to the sensor chip 101. In the shipment, a suitability is sought by obtaining an appropriate detection output in this state. In this case, the variation in the sensing property due to the time-varying interior stress cannot be ignored.

That is, after the shipment of the rotation detection device to the market and the mounting of the rotation detection device to a vehicle-mounted engine or a general machine, the interior stress which is applied to the sensor chip 101 has a tendency to be gradually released due to an environment change such as a temperature stress and the like.

Due to the release of the interior stress, an offset variation will be caused because of a magnetostriction effect. Thus, it is difficult to avoid the influence of the offset variation on the sensing property of the rotation detection device.

Recently, it is proposed that the sensor chip 101 in a bare-chip state is mounted to the sensor body member 120 and both the sensor chip 101 and the magnet 30 are covered by the cap member 40. In this case, the cap member 40 is bottomed, and the opening end of the cap member 40 is joined to the sensor body member 120.

On the other hand, with the miniaturization of various sensor members, the miniaturization of the rotation detection device is desirable. Specially, it is desirable to shorten a distance from a mounting surface (to vehicle-mounted engine or the like) to an end surface of the rotation detection device, that is, a distance UL (i.e., under-neck length) from the mounting surface of the flange 123 of the rotation detection device (shown in FIG. 12) to the outer surface of the end portion of the cap member 40.

Because the detection sensitivity of the rotation detection device greatly depends on the distance between the end surface of the rotation detection device and the detection object (e.g., rotor RT), it is important to set the distance UL which corresponds to a distance of the inner side of the mounting surface of the flange 40. Practically, in addition to shorten the distance UL, it is also desirable to provide the rotation detection devices having various sizes corresponding to the machines to which the rotation detection devices are to be mounted.

However, in the case where the sensor chip in the state of the bare chip is mounted to the sensor body member 120, the following problems cannot be ignored. That is, though the joining area between the sensor body member 120 and the cap member 40 can be maintained in the case where the rotation detection device is provided with the long distance UL, it is difficult to maintain the joining area in the case where the rotation detection device is provided with the short distance UL.

Thus, it is difficult to sufficiently maintain the joining area between the sensor body member 120 and the cap member 40. In the case where the hermeticity of the joining portion cannot be maintained due to the vibration or the like of the object to which the rotation detection device is mounted, the isolation of the sensor chip 101 (mounted in bare chip state) from the ambient air is deteriorated.

SUMMARY OF THE INVENTION

In view of the above-described disadvantages, it is an object of the present invention to provide a rotation detection device, where a sensor body member and a cover member are substantially joined to each other and a variation over time of a detection property is reduced.

According to the present invention, a rotation detection device has a magnetism detection unit for a detection of a rotation of a detection object which is magnetic, a magnet for applying a magnetic field to the magnetism detection unit, a connection member for electrically connecting the magnetism detection unit with the exterior, a sensor body member which has a mounting portion protruding from a mounting-portion protrusion surface of the sensor body member and a joint portion positioned around the mounting-portion protrusion surface, and a cover member which is bottomed and has an opening at an opening end thereof. The magnet has a substantial cylinder shape. The magnetism detection unit is fixedly mounted to the mounting portion and electrically connected with the connection member. The magnetism detection unit and the mounting portion of the sensor body member are arranged in the magnet. The opening end of the cover member is joined to the joint portion of the sensor body member in such a manner that the magnet is housed in the cover member and the mounting-portion protrusion surface is covered by the cover member. The magnetism detection unit senses a variation of the magnetic field due to a rotation of the detection object so that the rotation of the detection object is detected. The opening end of the cover member has a joining surface which is joined to a joining surface of the joint portion of the sensor body member. One of the joining surfaces has at least one of a flange-shaped portion and a bent portion. The other of the joining surfaces has a shape corresponding to that of the one thereof. The flange-shaped portion circumferentially protrudes outwards from the cover member or the sensor body member.

Accordingly, the sensor chip (magnetism detection unit) can be mounted to the mounting portion of the sensor body member in a bare-chip state, while being isolated from the ambient air by the cover member. Therefore, the variation over time in the sensing property of the rotation detection device can be substantially restricted.

Moreover, one of the joining surface of the opening end of the cover member and that of the joint portion of the sensor body member has at least one of the flange-shaped portion and the bent-shaped portion. The other of the joining surfaces has the shape corresponding to that of the one thereof. Thus, the joining surface of the joint portion and that of the opening end of the cover member can be provided with a lager joining area per unit length in the direction of a distance of the inner side of the mounting surface (i.e., distance UL with reference to FIG. 12), that is, in the direction perpendicular to the chip-mounting-portion protrusion surface of the sensor body member. Therefore, even when the distance (distance UL) of the inner side of the mounting surface in the rotation detection device is short, the adequate joining area between the sensor body member and the cover member can be readily maintained. Thus, the sensor body member and the cover member can be firmly joined to each other irrespective of the distance UL of the inner side of the mounting surface. Accordingly, the isolation of the sensor chip from the ambient air of the exterior by the cover member can be further improved.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLED EMBODIMENTS

First Embodiment

Figure 1:
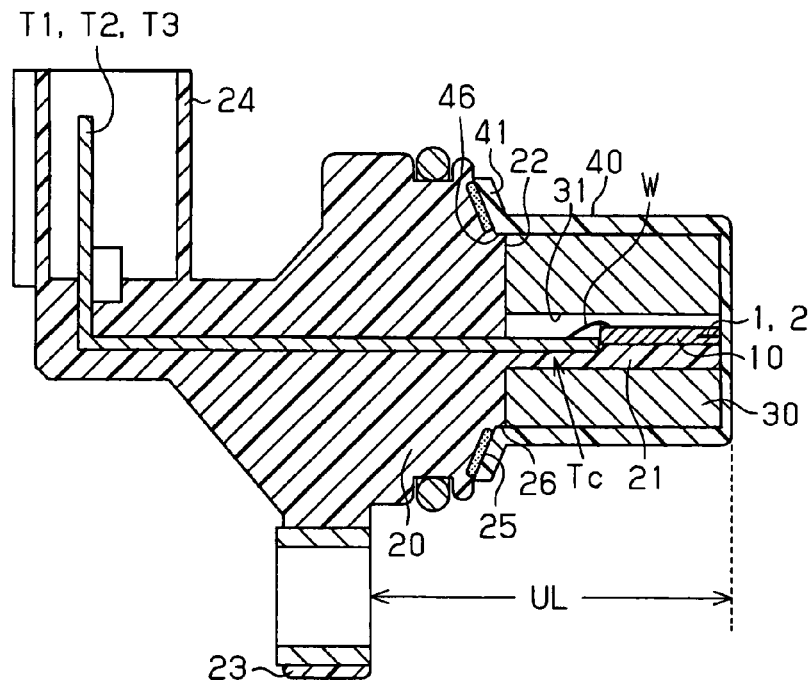
FIG. 1 is a schematic sectional view showing a rotation detection device according to a first embodiment of the present invention.

A rotation detection device according to a first embodiment of the present invention will be described with reference to FIGS. 1-6. With reference to FIG. 1, the rotation detection device can be suitably used to detect a rotation state of a detection object, for example, a crank angle sensor of a vehicle-mounted engine.

Figure 2:
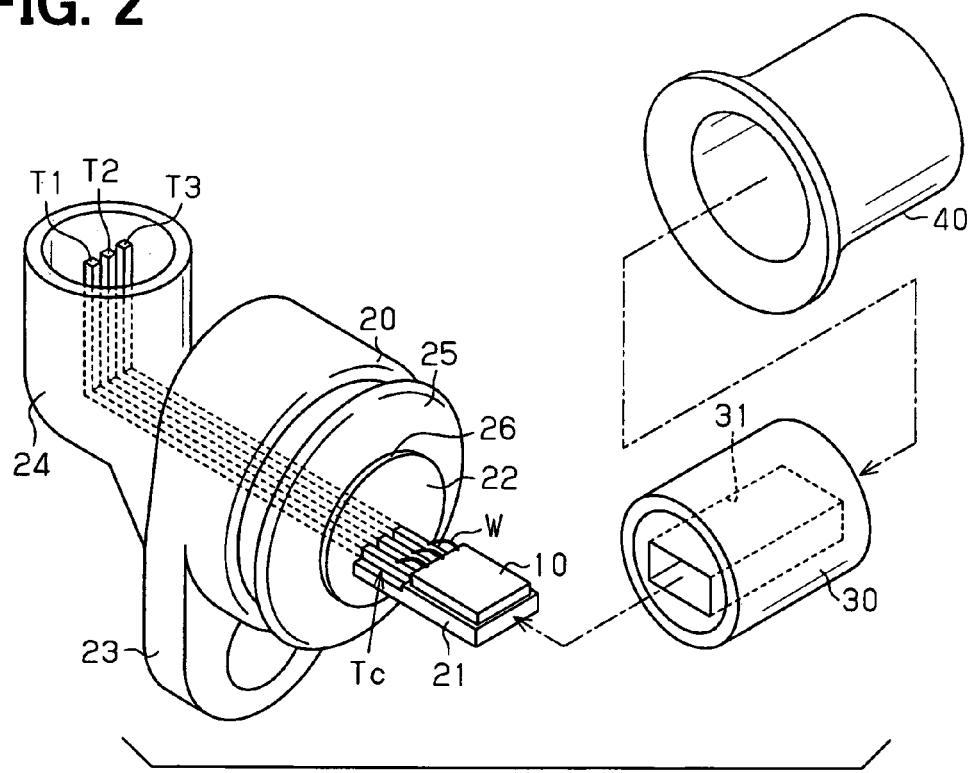
FIG. 2 is a disassembled perspective view showing the rotation detection device according to the first embodiment.

As shown in FIGS. 1 and 2, the rotation detection device has a magnet 30 (bias magnet) and a sensor chip 10 (magnetism detection unit) which is constructed of a bare chip. The magnet 30 and the sensor chip 10 are substantially closed in a housing which includes a sensor body member 20 and a cover member 40 (e.g., cap member), to be protected from ambient air of the exterior. The sensor body member 20 can be constructed of a non-magnetic material, for example, a resin such as PPS (polyphenylene sulphide).

In this case, the sensor chip 10 can be provided with magnetic resistance element pairs 1 and 2, each of which has two magnetic resistance elements. The sensor chip 10 can be integrated-circuit constructed together with a processing circuit.

A flange 23 is arranged at a side wall of the sensor body member 20, and can be fastened to an engine body and the like. Moreover, a connector portion 24 which is connected with an electronic control device and the like of the exterior is arranged at a part of the sensor body member 20 which extends from the flange 23.

The sensor body member 20 includes a mounting portion 21 (chip mounting portion) having a substantial plate shape, a joint portion 25, and a guide portion 26 which is arranged between an end surface 22 (i.e., mounting-portion protrusion surface) of the sensor body member 20 and the joint portion 25 to guide the mounting of the cover member 40 to the sensor body member 20.

The mounting-portion protrusion surface 22 (chip-mounting-portion protrusion surface) is positioned at one end of the sensor body member 20, to construct a lead-through surface of the chip mounting portion 21. That is, the chip mounting portion 21 protrudes outwards from the chip-mounting-portion protrusion surface 22, into the cover member 40. The joint portion 25 is continuous with the outer periphery of the guide portion 26.

As shown in FIGS. 1 and 2, the sensor chip 10 is electrically connected with connection members, which respectively have a feeding terminal T1, an output terminal T2 and a GND (grounding) terminal T3 to electrically connect the sensor chip 10 with the exterior. The connection member can be made of an electrical conductive material (e.g., metal) and double as a lead frame electrically connected with the sensor chip 10. The connection member can have a stick shape and bent in the sensor body member 20.

In this case, one end of the connection member is used as the terminal T1, T2 or T3 arranged at the connector portion 24. The other end of the connection member constructs a connection portion Tc for connecting with the sensor chip 10. The connection members are integrally molded in the sensor body member 20 to be mounted thereto. The sensor chip 10 is electrically connected with the connection portion Tc of the connection member through a bonding wire W.

With reference to FIG. 2, the magnet 30 can have a substantial cylinder shape. For example, the magnet 30 is provided with a hollow portion 31, which can have a shape (e.g., substantially quadrilateral shape) corresponding to that of the chip mounting portion 21. The sensor chip 10 and the chip mounting portion 21 of the sensor body member 20 are inserted in the hollow portion 31 to be covered by the magnet 30.

Figure 11:
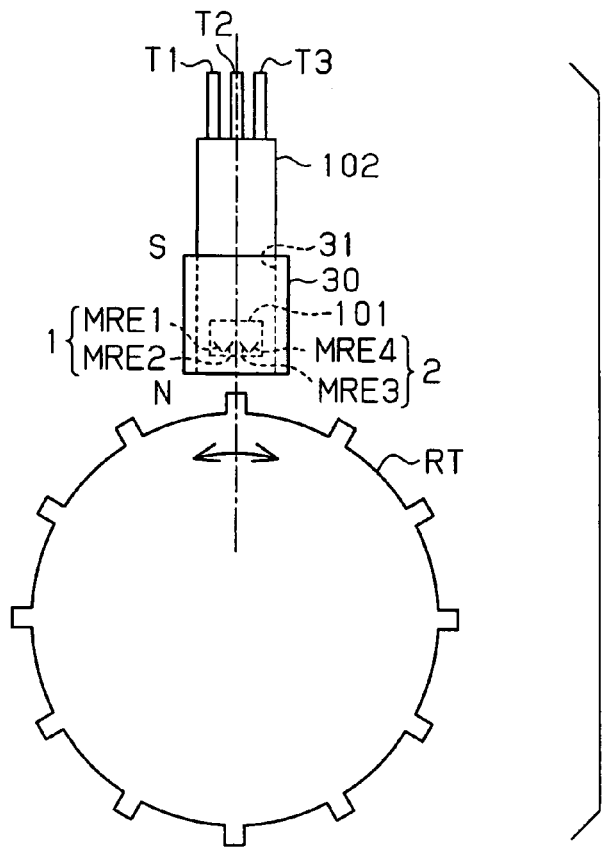
FIG. 11 is a schematic plan view showing a rotation detection device and a detection object according to a prior art.
Figure 12:
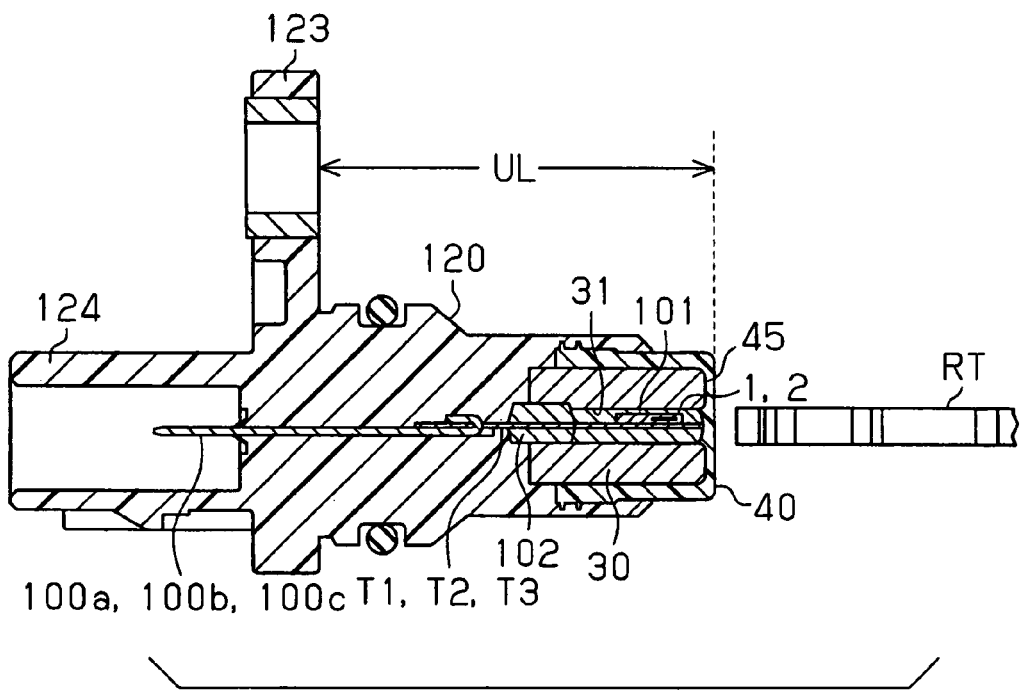
FIG. 12 is a schematic sectional view showing the rotation detection device according to the prior art.

The magnet 30 applies a bias magnetic field to the magnetic resistance element pairs 1 and 2 which are installed in the sensor chip 10. In the case where the detection object is a magnetic member such as a rotor RT (with reference to FIG. 11), a magnetic vector resultant due to the detection object and the bias magnet 30 will vary with the rotation of the detection object. The variation of the magnetic vector is sensed as a resistance value variation of the magnetic resistance element pair 1, 2. In this case, the magnetic field variation which is caused by a rotation of the detection object with respect to the magnet 30 is sensed, so that the rotation state of the detection object is detected.

The cover member 40 has a substantially cylinder shape and is bottomed. An opening end 41 and a bottom of the cover member 40 are respectively positioned at two axial ends of the cover member 40. The opening end 41 where the cover member 40 has an opening can construct a flange (brim) portion of the cover member 40. The joint portion 25 is joined to the opening end 41 of the cover member 40.

The cover member 40 is made of a non-magnetic material (e.g., resin such as PPS) and has a lower percentage of carbon (that is, has a higher laser transmittance) than the resin material constructing the sensor body member 20.

The inner surface of the cover member 40 is engaged with the guide portion 26 and the opening end 41 is joined to the joint portion 25, to block the chip-mounting-portion protrusion surface 22 of the sensor body member 20. Thus, the sensor chip 10, the chip mounting portion 21 and the magnet 30 are protected from the ambient air of the exterior.

According to the rotation detection device described in this embodiment, the joint portion 25 of the sensor body member 20 is joined to the opening end 41 of the cover member 40, so that the sensor body member 20 is integrated with the cover member 40. In this case, the joint portion 25 has a joining surface which is joined to a joining surface of the opening end 41 of the cover member 40. The joining surface of the joint portion 25 and that of the opening end 41 which contact each other can be provided with a taper shape with respect to a direction perpendicular to the chip-mounting-portion protrusion surface 22. That is, the opening end 41 of the cover member 40 is diameter-enlarged to have a flange shape so as to cover the joint portion 25, corresponding to the taper shape of the joining surface.

In this case, the joint portion 25 can be irradiated by laser through the opening end 41 of the cover member 40 from the exterior, so that the joint portion 25 is molten to be joined (that is, laser welded) to the opening end 41. Thus, the rotation detection device can be integrated. Moreover, the contact area between the sensor body member 20 and the cover member 40 can be maintained, even when a distance UL (i.e., distance of inner side of mounting surface) between the mounting surface of the flange 23 and the outer surface of the bottom of the cover member 40 is shortened.

Next, the manufacture method of the rotation detection device will be described with reference to FIGS. 3A, 3B and 4.

Figure 3A:
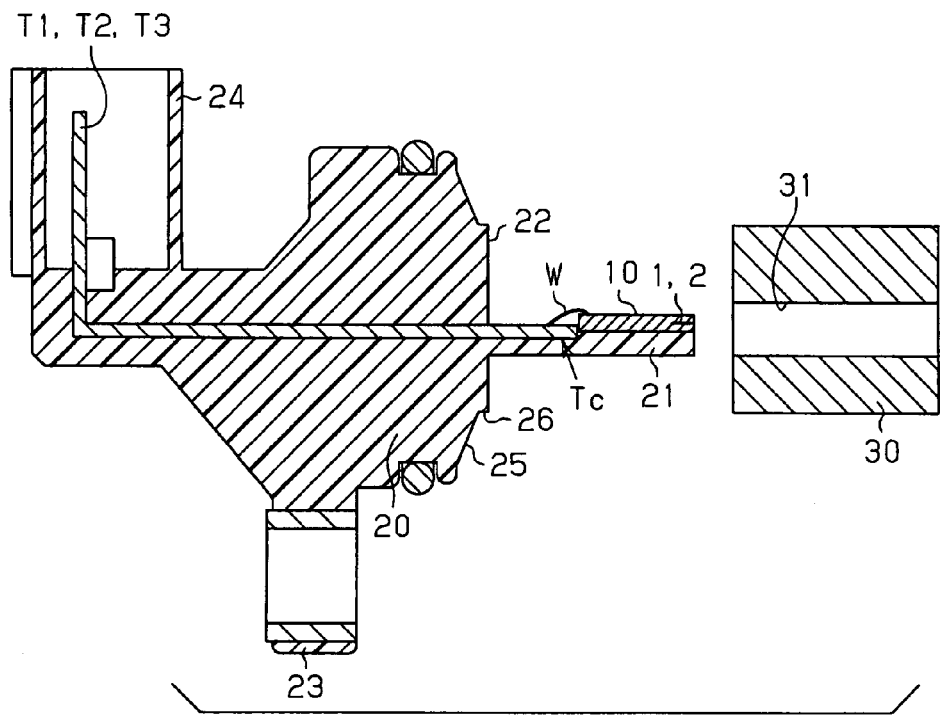
FIG. 3A and FIG. 3B are schematic sectional views which respectively show a first step and a second step of a manufacture method of the rotation detection device according to the first embodiment.

With reference to FIG. 3A, at first, the sensor body member 20 which includes the chip mounting portion 21, the joint portion 25 and the guide portion 26 is beforehand constructed by injection-molding (using a suitable mold) or the like, while the end portions (of side where terminals T1, T2 and T3 are arranged) of the connection members are molded in the sensor body member 20.

Then, the sensor chip 10 is mounted to the chip mounting portion 21 of the sensor body member 20, by an adhesive or the like. In this case, after the sensor chip 10 is fixed to the chip mounting portion 21, the sensor chip 10 is electrically connected with the connection portion Tc of the connection member through the bonding wire W.

On the other hand, the magnet 30 can be constructed by injection-molding (using a suitable mold) or the like as a separate component from the sensor body member 20, and magnetized. Similarly, the cover member 40 can be constructed by injection-molding (using a suitable mole) or the like, as a separate component from the sensor body member 20 and the magnet 30.

Figure 3B:
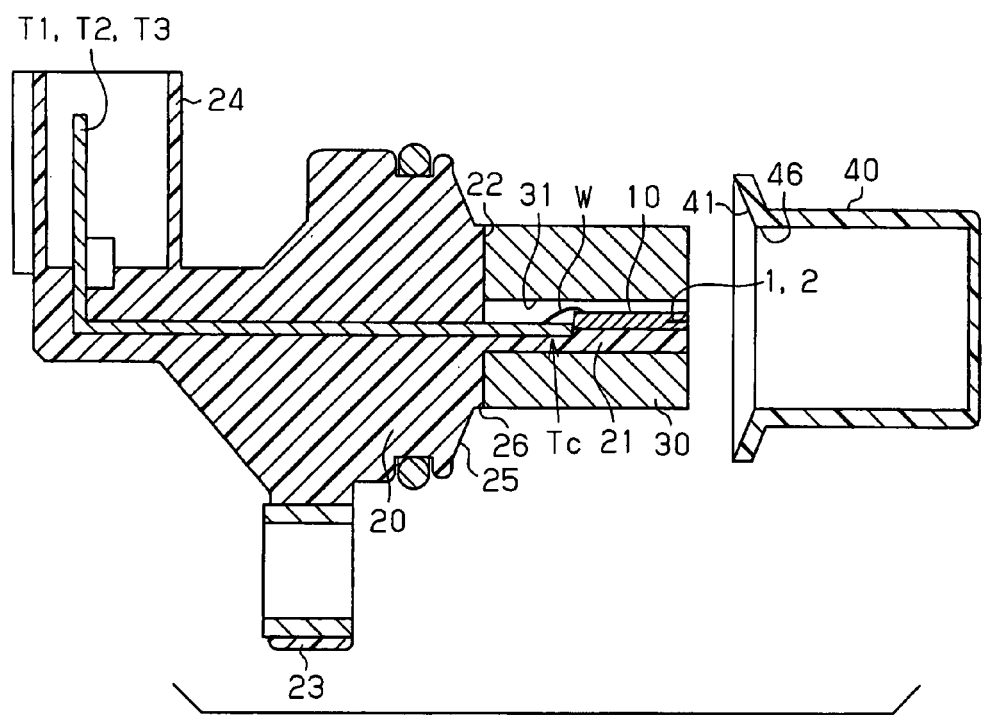

Thereafter, with reference to FIG. 3B, after the magnet 30 is mounted to the sensor body member 20 to cover the sensor chip 10 and the chip mounting portion 21 of the sensor body member 20, the cover member 40 is fitted to the magnet 30 in such a manner that an inner surface 46 of the cover member 40 is engaged with the guide portion 26 of the sensor body member 20.

Figure 4:
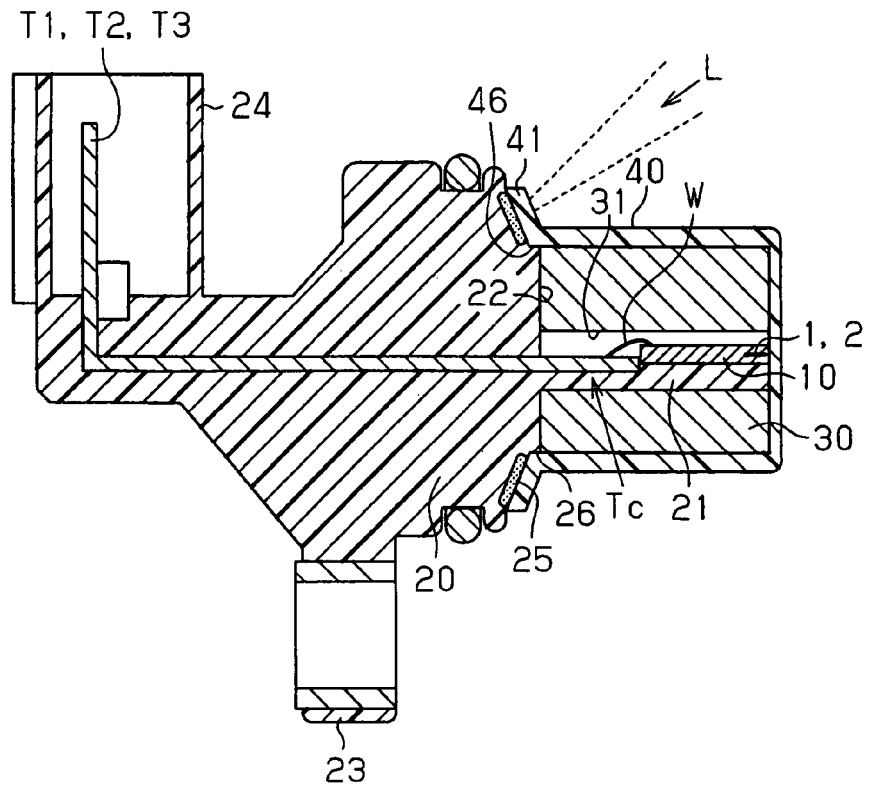
FIG. 4 is a schematic sectional view showing a third step of the manufacture method of the rotation detection device according to the first embodiment.

Then, as shown in FIG. 4, the laser L from the exterior is provided to irradiate the joining surface of the opening end 41 of the cover member 40 and that of the joint portion 25 of the sensor body member 20 which have been assembled.

As described above, the material (e.g., resin material) of the cover member 40 has the higher laser transmittance than the material (e.g., resin material) of the sensor body member 20, so that the joint portion 25 is earlier molten to integrate the sensor body member 20 with the cover member 40. Because the stance of the cover member 40 can be properly maintained with respect to the sensor body member 20 by the engagement between the inner surface 46 of the cover member 40 and the guide portion 26 of the sensor body 20, the welding accuracy can be improved.

Next, the effects of the rotation detection device will be described.

According to this embodiment, the joining surface of the joint portion 25 and that of the opening end 41 which contact each other are provided with the taper shape in the direction perpendicular to the chip-mounting-portion protrusion surface 22 of the sensor body member 20. Therefore, the joining surface of the joint portion 25 and that of the opening end 41 can be provided with a lager joining area per unit length in the direction of the distance UL, that is, the direction perpendicular to the chip-mounting-portion protrusion surface 22 of the sensor body member 20.

Thus, even when the distance UL of the inner side of the mounting surface is short, the adequate joining area between the sensor body member 20 and the cover member 40 can be readily maintained. The sensor body member 20 and the cover member 40 can be firmly joined to each other irrespective of the distance UL of the inner side of the mounting surface. Accordingly, the isolation of the sensor chip 10 from the ambient air of the exterior by the cover member 40 can be improved.

Moreover, according to this embodiment, the sensor chip 10 in the state of the bare chip is mounted to the chip mounting portion 21 of the sensor body member 20. Therefore, the mounting position of the sensor chip 10 at the chip mounting portion 21 can be positioned with a high accuracy. Moreover, the occurrence of inner stress in the molding and the influence on the detection property (i.e., sensing property) due to the release of the inner stress can be reduced, as compared with a conventional rotation detection device where the sensor chip 10 is resin-molded. That is, according to this embodiment, the variation over time in the sensing property of the rotation detection device can be reduced.

According to this embodiment, the joint portion 25 of the sensor body member 20 is provided with the guide portion 26, which extends from the joint portion 25 and is engaged with the inner surface 46 of the cover member 40 to guide the mounting of the cover member 40 with respect to the sensor body member 20. Thus, the cover member 40 can be readily mounted to the sensor body member 20. Moreover, the stance of the cover member 40 with respect to the sensor body member 20 can be suitably maintained in the joining process.

Moreover, according to this embodiment, the joint portion 25 of the sensor body member 20 and the opening end 41 of the cover member 40 are joined to each other by the laser-welding. Thus, the joining of the opening end 41 of the cover member 40 with respect to the joint portion 25 of the sensor body member 20 can be performed stably, and the joining strength can be improved. Particularly, the guide portion 26 extends from the joint portion 25 of the sensor body member 20, so that the stability in the joining (welding) process can be improved.

In this case, the material of the cover member 40 has the lower carbon percentage than the material of the sensor body member 20. Thus, the laser transmittance of the resin material of the cover member 40 is higher than that of the sensor body member 20, so that the laser welding can be performed with a heightened stability and an improved efficiency.

As described above with reference to FIG. 1, the joining surface of the joint portion 25 of the sensor body member 20 and that of the opening end 41 of the cover member 40 have the taper shape. In this case, the taper-shaped contact surface can be substantially linear in the cross section thereof taken along the axis direction of the cover member 40.

Figure 5:
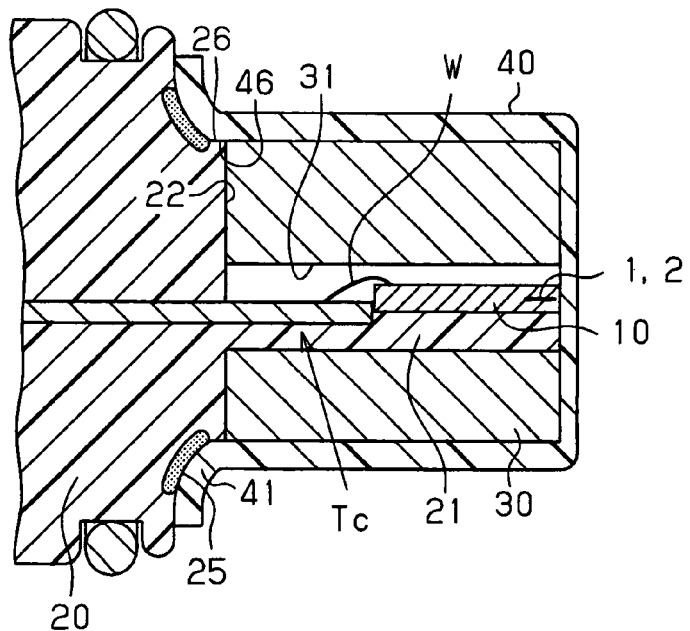
FIG. 5 is a partially enlarged sectional view showing a rotation detection device according to a first modification of the first embodiment.

Alternatively, according to a first modification of this embodiment, as shown in FIG. 5, the joining surface of the joint portion 25 and that of the opening end 41 have a curvature in a tapering direction of the taper shape. That is, the taper-shaped joining surface of the joint portion 25 is concave (as shown in FIG. 5 which is cross sectional view taken along axis direction of cover member 40), when being viewed from the side of the cover member 40. Correspondingly, the taper-shaped joining surface of the opening end 41 is convex (as shown in FIG. 5 which is cross sectional view taken along axis direction of cover member 40), when being viewed from the side of the sensor body member 20.

Figure 6:
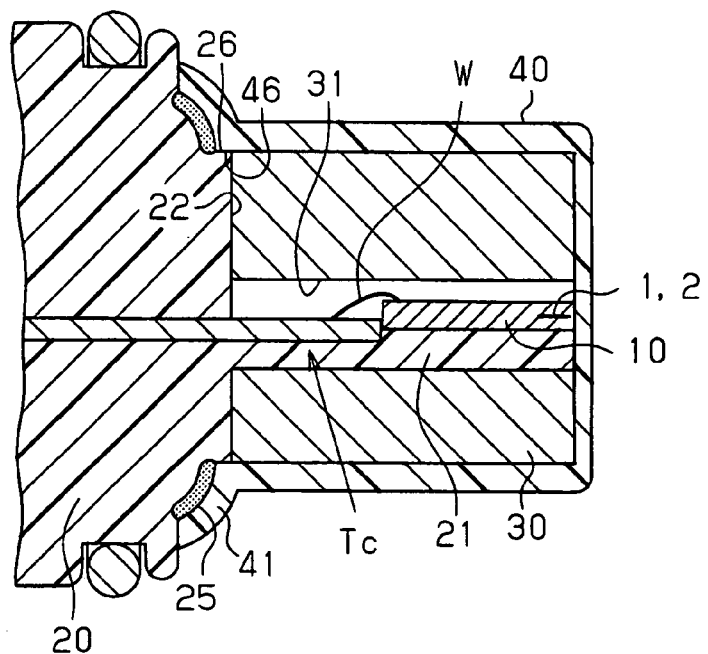
FIG. 6 is a partially enlarged sectional view showing a rotation detection device according to a second modification of the first embodiment.

More alternatively, according to a second modification of this embodiment, as shown in FIG. 6, the joining surface of the joint portion 25 and that of the opening end 41 are provided with the taper shape which has a curvature in a tapering direction of the taper shape. The taper-shaped joining surface of the joint portion 25 is convex (as shown in FIG. 6 which is cross sectional view taken along axis direction of cover member 40), when being viewed from the side of the cover member 40. Correspondingly, the taper-shaped joining surface of the opening end 41 is concave (as shown in FIG. 6 which is cross sectional view taken along axis direction of cover member 40), when being viewed from the side of the sensor body member 20.

According to each of the first modification and the second modification, the joining surface of the joint portion 25 of the sensor body member 20 and that of the opening end 41 of the cover member 40 have a further lager joining area per unit length in the direction of the distance UL (shown in FIG. 1) of the inner side of the mounting surface.

Second Embodiment

Next, a second embodiment of the present invention will be described with reference to FIG. 7. In this case, the shapes of the joining portion 25 of the sensor body member 20 and the opening end 41 of the cover member 40 which are joined to each other are different from those described in the above-described first embodiment. That is, the shapes of the joining surfaces are different from those of the first embodiment. The effect similar to the first embodiment can be provided by the second embodiment.

In the first embodiment, the joining surface of the joint portion 25 of the sensor body member 20 and that of the opening end 41 of the cover member 40 which are integrated with each other have the taper shape with respect to the direction perpendicular to the chip-mounting-portion protrusion surface 22 of the sensor body member 20.

Figure 7:
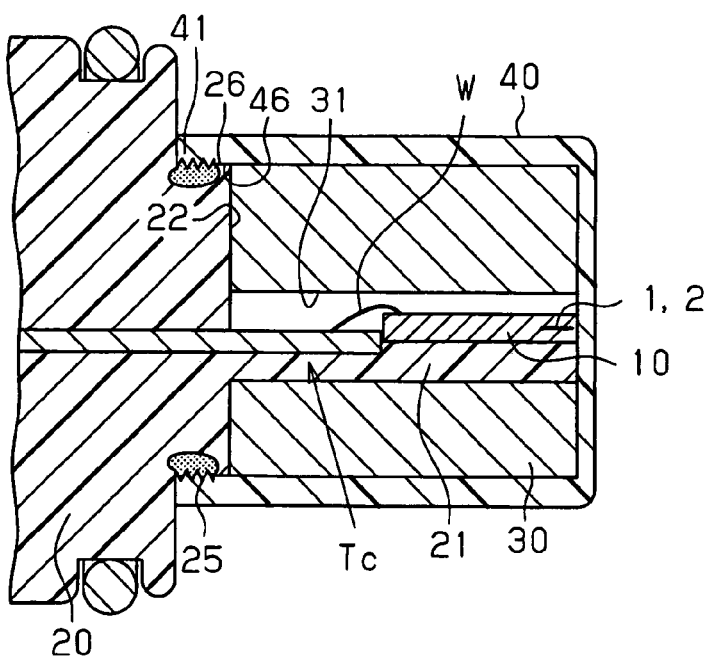
FIG. 7 is a partially enlarged sectional view showing a rotation detection device according to a second embodiment of the present invention.

According to the second embodiment, as shown in FIG. 7, the joining surface of the joint portion 25 is provided with a rugged portion which has at least one projection and at least one depression. Correspondingly, the joining surface of the opening end 41 of the cover member 40 is provided with a rugged portion which has at least one projection and at least one depression to correspond to the rugged portion of the joining surface of the joint portion 25. In this case, the opening end 41 of the cover member 40 can be arranged to substantially linearly extend from the cylindrical portion of the cover member 40, or have the taper shape with respect to the cylindrical portion. Thus, the joint portion 25 of the sensor body member 20 is shaped corresponding to the opening end 41 of the cover member 40.

According to the second embodiment, the joining surfaces of the joint portion 25 and the opening end 41 can be integrally engaged with each other with a larger contact area. In this embodiment, the guide portion 26 can be also omitted.

According to the second embodiment, the stance of the cover member 40 with respect to the sensor body member 20 can be suitably maintained. Moreover, the stability in the joining process (by laser welding or the like) of the joining surfaces of the joint portion 25 and the opening end 41 can be further improved.

In the second embodiment, each of the joining surface of the joint portion 25 and that of the opening end 41 is provided with the at least one projection and at least one depression so that the joining area between the joining surfaces can be enlarged.

When the cover member 40 is mounted to the sensor body member 20, the projection and depression of the joining surface of the opening end 41 and those of the joining surface of the joint portion 25 can be also used similarly to a screwing construction between a male screw and a female screw.

About the rotation detection device, what has not described in the second embodiment is the same with the first embodiment.

Third Embodiment

Figure 8:
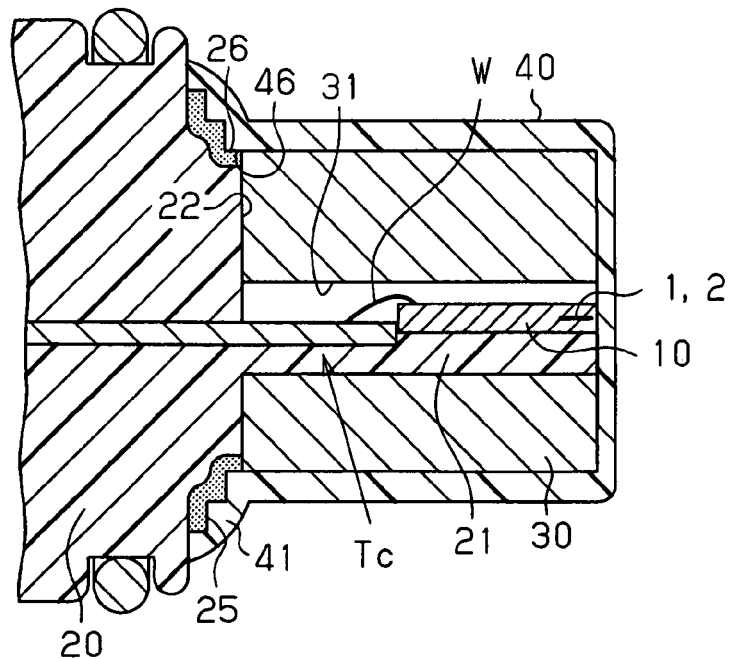
FIG. 8 is a partially enlarged sectional view showing a rotation detection device according to a third embodiment of the present invention.

According to a third embodiment of the present invention with reference to FIG. 8, the shapes of the joining portion 25 of the sensor body member 20 and the opening end 41 of the cover member 40 which contact each other are different from those described in the above-described embodiments. That is, the shapes of the joining surfaces are different from those of the above-described embodiments.

As shown in FIG. 8, the joining surface of the joint portion 25 of the sensor body member 20 is provided with a stepped shape. Correspondingly, the joining surface of the opening end 41 of the cover member 40 has a stepped shape which is integrally engaged with the stepped shape of the joining surface of the joint portion 25. The joining surface of the joint portion 25 and that of the opening end 41 are joined to each other.

About the rotation detection device, what has not described in the third embodiment is the same with the first embodiment. The effect similar to the first embodiment can be provided by the third embodiment.

Fourth Embodiment

Figure 9:
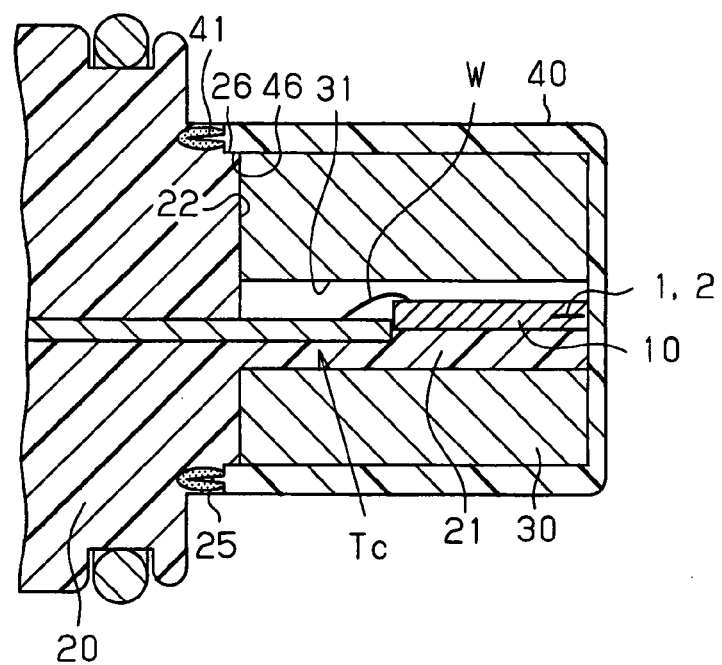
FIG. 9 is a partially enlarged sectional view showing a rotation detection device according to a fourth embodiment of the present invention.

According to a fourth embodiment of the present invention with reference to FIG. 9, the shapes of the joining portion 25 of the sensor body member 20 and the opening end 41 of the cover member 40 which contact each other are different from those described in the above-described embodiments. That is, the shapes of the joining surfaces are different from those of the above-described embodiments.

According to the fourth embodiment, as shown in FIG. 9, a wedge-shaped groove is arranged at the joining surface of the joint portion 25 of the sensor body member 20. Correspondingly, the joining surface of the opening end 41 of the cover member 40 has a wedge-shaped protrusion which is integrally engaged with (inserted in) the groove of the joining surface of the joint portion 25. In this case, the opening end 41 of the cover member 40 can be arranged to substantially linearly extend from the cylindrical portion of the cover member 40, or have the taper shape with respect to the cylindrical portion. Thus, the joint portion 25 of the sensor body member 20 is shaped corresponding to the opening end 41 of the cover member 40.

Alternatively, the substantially wedge-shaped groove can be also provided at the joining surface of the opening end 41 of the cover member 40, and the substantially wedge-shaped protrusion can be also provided at the joining surface of the joint portion 25 of the sensor body member 20.

About the rotation detection device, what has not described in the fourth embodiment is the same with the first embodiment. The effect similar to the first embodiment can be provided by the fourth embodiment.

Fifth Embodiment

Figure 10:
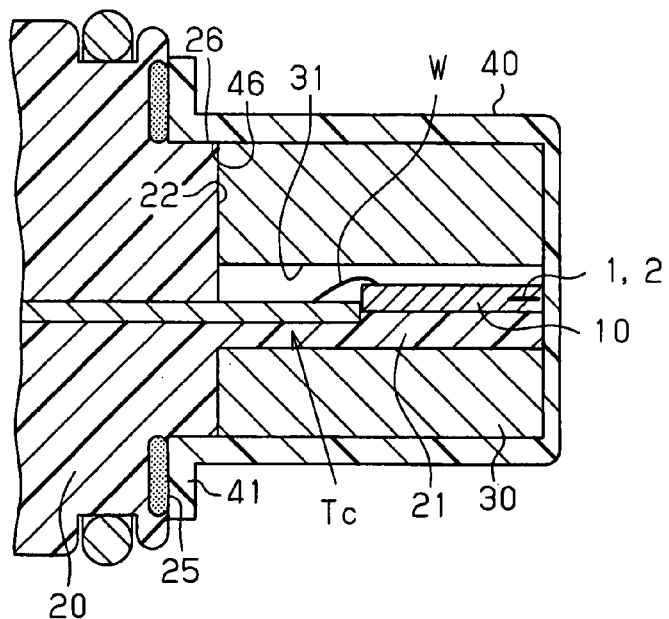
FIG. 10 is a partially enlarged sectional view showing a rotation detection device according to a fifth embodiment of the present invention.

According to a fifth embodiment of the present invention with reference to FIG. 10, the shapes of the joining portion 25 of the sensor body member 20 and the opening end 41 of the cover member 40 which contact each other are different from those described in the above-described embodiments. That is, the shapes of the joining surfaces are different from those of the above-described embodiments.

As shown in FIG. 10, the joint portion 25 of the sensor body member 20 has a ring shape which is substantially parallel with the chip-mounting-portion protrusion surface 22 of the sensor body member 20. In this case, the guide portion 26 (which is engaged with inner surface 46 of cover member 40) of the sensor body member 20 can be substantially perpendicular to the chip-mounting-portion protrusion surface 22 and the joint portion 25.

Correspondingly, the opening end 41 of the cover member 40 has a ring shape which is substantially perpendicular to the inner surface 46 of the cover member 40. That is, the opening end 41 constructs the brim (flange) of the cover member 40, which is substantially perpendicular to the cylindrical portion of the cover member 40. In this case, the ring-shaped joining surface of the joint portion 25 is integrally engaged with the ring-shaped joining surface of the opening end 41.

About the rotation detection device, what has not described in the fifth embodiment is the same with the first embodiment. The effect similar to the first embodiment can be provided by the fifth embodiment.

OTHER EMBODIMENT

Although the present invention has been fully described in connection with the preferred embodiments thereof with reference to the accompanying drawings, it is to be noted that various changes and modifications will become apparent to those skilled in the art.

In the above-described embodiments, the sensor body member 20 and the cover member 40 can be constructed of the PPS resin. In this case, the material of the cover member 40 has the higher laser transmittance than the sensor body member 20 by the adjustment of the carbon percentage in the material. However, each of the sensor body member 20 and the cover member 40 can be constructed of other resin. Moreover, the laser transmittance can be adjusted by other method. For example, the laser transmittance can be adjusted, by altering a pigment and/or an addition material in the PPS resin. Alternatively, the laser transmittance can be adjusted, by modifying the composition of the resin. More alternatively, the cover member 40 can be constructed of a transparent resin which has an excellent laser transmittance.

In the above-described embodiment, the sensor body member 20 and the cover member 40 can be integrated with each other by the laser welding, for example. Alternatively, the sensor body member 20 and the cover member 40 can be also integrated with each other by other welding method such as a vibration welding, a hot plate welding and the like. More alternatively, the sensor body member 20 and the cover member 40 can be also integrated with each other by bonding through an adhesive or the like. In the case where the sensor body member 20 and the cover member 40 are integrated with each other by the joining method other than the welding, the sensor body member 20 and the cover member 40 can be constructed of any resin material which is suitable for the joining method.

In the above-described embodiments, the guide portion 26 (of sensor body member 20) which is engaged with the inner surface 46 of the cover member 40 extends from the joining portion 25 of the sensor body member 20 to guide the mounting of the cover member 40 to the sensor body member 20. However, including the second embodiment, the guide portion 26 can be also omitted if the stance of the cover member 40 with respect to the sensor body member 20 can be maintained. In this case, a jig unit or the like can be used to maintain the suitable stance of the cover member 40.

Moreover, the shapes of the joining surfaces of the joining portion 25 of the sensor body member 20 and the opening end 41 of the cover member 40 can be also set in other manner, without being limited to the shapes in the above-described embodiments. Furthermore, each of the joint portion 25 and the opening end 41 can be also provided with the shape which is a combination of the shape characteristics respectively defined in the different above-described embodiments.

Furthermore, in the above-described embodiments, the joint portion 25 of the sensor body member 20 is covered by the opening end 41 of the cover member 40. However, the position relation between the joint portion 25 of the sensor body member 20 and the opening end 41 of the cover member 40 can be also contrary to that. That is, the opening end 41 of the cover member 40 can be also covered by the joint portion 25 of the sensor body member 20. The joint portion 25 can protrude from the outer periphery of the chip-mounting-portion protrusion surface 22 of the sensor body member 20, toward the protruding direction of the chip mounting portion 21.

In this case, the inner surface of the joint portion 25 contacts the outer surface of the opening end 41 of the cover member 40. The sensor body member 20 and the cover member 40 can be integrated with each other by the laser welding or the like, and constructed of the resin material, for example. In this case, it is desirable that the resin material of the sensor body member 20 has a higher laser transmittance than the resin material of the cover member 40. Moreover, for example, the joining surface of the sensor body member 20 and the joining surface of the cover member 40 which are joined to each other are shaped similarly to what is described above, so that the joining area per unit length in the direction of the distance UL of the inner side of the mounting surface is enlarged.

In the above-described embodiments, the sensor chip 10 is constructed of a single chip in which the processing circuit and the like are integrated. However, for example, the processing circuit can be also integrated in a chip other than the sensor chip 10.

Such changes and modifications are to be understood as being in the scope of the present invention as defined by the appended claims.

What is claimed is:

1. A rotation detection device, comprising:
   a magnetism detection unit for a detection of a rotation of a detection object which is magnetic;
   a magnet for applying a magnetic field to the magnetism detection unit, the magnet having a substantial cylinder shape;
   a connection member for electrically connecting the magnetism detection unit with the exterior;
   a sensor body member having a mounting portion which protrudes from a mounting-portion protrusion surface of the sensor body member, and a joint portion which is positioned around the mounting-portion protrusion surface,
   the magnetism detection unit being fixedly mounted to the mounting portion and electrically connected with the connection member, the magnetism detection unit and the mounting portion of the sensor body member being arranged in the magnet; and
   a cover member which is bottomed and has an opening at an opening end thereof, the opening end of the cover member being joined to the joint portion of the sensor body member in such a manner that the magnet is housed in the cover member and the mounting-portion protrusion surface is covered by the cover member, wherein:
   the magnetism detection unit senses a variation of the magnetic field due to a rotation of the detection object so that the rotation of the detection object is detected; and
   the opening end of the cover member has a joining surface which is joined to a joining surface of the joint portion of the sensor body member, one of the joining surfaces having at least one of a flange-shaped portion and a bent portion, an other of the joining surfaces having a shape corresponding to that of the one thereof, the flange-shaped portion circumferentially protruding outwards from the cover member or the sensor body member.

2. The rotation detection device according to claim 1, wherein
the joining surface of the joint portion of the sensor body member and the joining surface of the opening end of the cover member have a taper shape with respect to a direction perpendicular to the mounting-portion protrusion surface of the sensor body member.

3. The rotation detection device according to claim 2, wherein
the joining surface of the joint portion of the sensor body member and the joining surface of the opening end of the cover member have a curvature in a tapering direction of the taper shape.

4. The rotation detection device according to claim 1, wherein
the joining surface of the joint portion of the sensor body member and the joining surface of the opening end of the cover member have a rugged portion which has at least one projection and at least one depression with respect to a direction perpendicular to the mounting-portion protrusion surface of the sensor body member.

5. The rotation detection device according to claim 1, wherein
the joining surface of the joint portion of the sensor body member and the joining surface of the opening end of the cover member have a stepped shape with respect to a direction perpendicular to the mounting-portion protrusion surface of the sensor body member.

6. The rotation detection device according to claim 1, wherein
one of the joining surface of the joint portion of the sensor body member and the joining surface of the opening end of the cover member has a wedge-shaped protrusion and an other of the joining surfaces has a wedge-shaped groove with respect to a direction perpendicular to the mounting-portion protrusion surface of the sensor body member, the wedge-shaped protrusion being inserted in the wedge-shaped groove.

7. The rotation detection device according to claim 1, wherein
the joining surface of the joint portion of the sensor body member and the joining surface of the opening end of the cover member have a substantial ring shape which is substantially parallel to the mounting-portion protrusion surface of the sensor body member.

8. The rotation detection device according to claim 1, wherein
the sensor body member has a guide portion which extends from the joint portion to guide a mounting of the cover member to the sensor body member, the guide portion being engaged with an inner surface of the cover member.

9. The rotation detection device according to claim 1, wherein:
the joint portion of the sensor body member and the opening end of the cover member are joined to each other by laser welding.

10. The rotation detection device according to claim 9, wherein:
the sensor body member and the cover member are respectively made of resin materials, the resin material of the cover member having a higher laser transmittance than the resin material of the sensor body member; and
the joint portion of the sensor body member is covered by the opening end of the cover member to be joined thereto.

11. The rotation detection device according to claim 10, wherein
the sensor body member and the cover member are respectively made of the PPS resin materials, the PPS resin material of the cover member having a lower carbon percentage than the PPS resin material of the sensor body member.

12. The rotation detection device according to claim 1, wherein
the magnetism detection unit is arranged as a sensor chip, which is mounted to the mounting portion of the sensor body member in a bare-chip state.

* * * * *